June 20, 1961  R. PIERCE, JR., ET AL  2,989,135
METHOD FOR SEISMIC SURVEYING

Filed Aug. 24, 1955  5 Sheets-Sheet 1

INVENTORS
RUSSELL PIERCE, Jr.
& WILLIAM H. COX
BY
ATTORNEYS

INVENTORS
RUSSELL PIERCE, Jr.
& WILLIAM H. COX
BY
ATTORNEYS

United States Patent Office 2,989,135
Patented June 20, 1961

2,989,135
METHOD FOR SEISMIC SURVEYING
Russell Pierce, Jr., and William H. Cox, Beaumont, Tex., assignors to Sun Oil Company, Philadelphia, Pa., a corporation of New Jersey
Filed Aug. 24, 1955, Ser. No. 530,339
2 Claims. (Cl. 181—.5)

This invention relates to a method for seismic surveying and, more particularly, to a method for removing, as completely as necessary, a type of seismic noise which is non-random in that some of its characteristics can be predicted. The removal is accomplished by a cancellation process made possible by the use of predictable characteristics comprising the step-out of the interfering signal, its relation to the desired signal and the similarity of signals on adjacent record channels. The removal of the interference is effected while good control is maintained over the desired signals, thus preserving the utility of the desired signals.

One commonly employed method of surveying involves the use of two or more hydrophones positioned in a bore hole. The output of each of the hydrophones in response to energy waves received from a source of seismic disturbance produces a record which is indicative of the nature of the underlying strata. In this type of operation, non-directional hydrophones are employed in preference to directional geophones for the reason that hydrophones are sensitive to pressure and not directly sensitive to motion of the detector. For this reason the hydrophones are less sensitive to interference from energy transmitted to the hydrophones by the cables suspending them in the bore hole. The hydrophones have, however, the disadvantage of being non-directional and thus they detect signals received from above as well as from below. Therefore, when waves are received by a hydrophone from a remote seismic disturbance, the received waves are detected indiscriminately regardless of whether they are waves reflected upwardly from an underlying interface or whether they are waves reflected downwardly from an overlying interface. Furthermore, most of the commonly used detectors including velocity detectors are bi-directional and hence receive signals from above as well as from below the detector.

It is an object of the present invention to provide a method for mixing the records produced from a pair of bore hole detectors so as to remove from the records signals received from energy traveling in one direction toward the pair of detectors and to accentuate in the records signals resulting from energy arriving at the detectors from the opposite direction.

Another commonly employed method of surveying is to position on or adjacent to the surface of the earth an array of detectors which are responsive to energy waves received from a source of seismic disturbance which is positioned below the weathered layer in order that a maximum amount of energy from the source of seismic disturbance will pass downwardly into the earth and be reflected upwardly to the detectors from an underlying interface. Energy from the source of seismic disturbance also passes upwardly and is then reflected downwardly from the underside of the weathered layer to the underlying interface. These energy waves are also reflected upwardly to the detectors and appear on the records produced as a type of seismic noise tending to obscure the desired information contained in the record.

It is a further object of the invention to provide a method for mixing the records produced by the various detectors so as to remove these obscuring signals from a final resultant record.

These and other objects of the invention will become apparent from the following description when read in conjunction with the accompanying drawings, in which.

Figure 1:
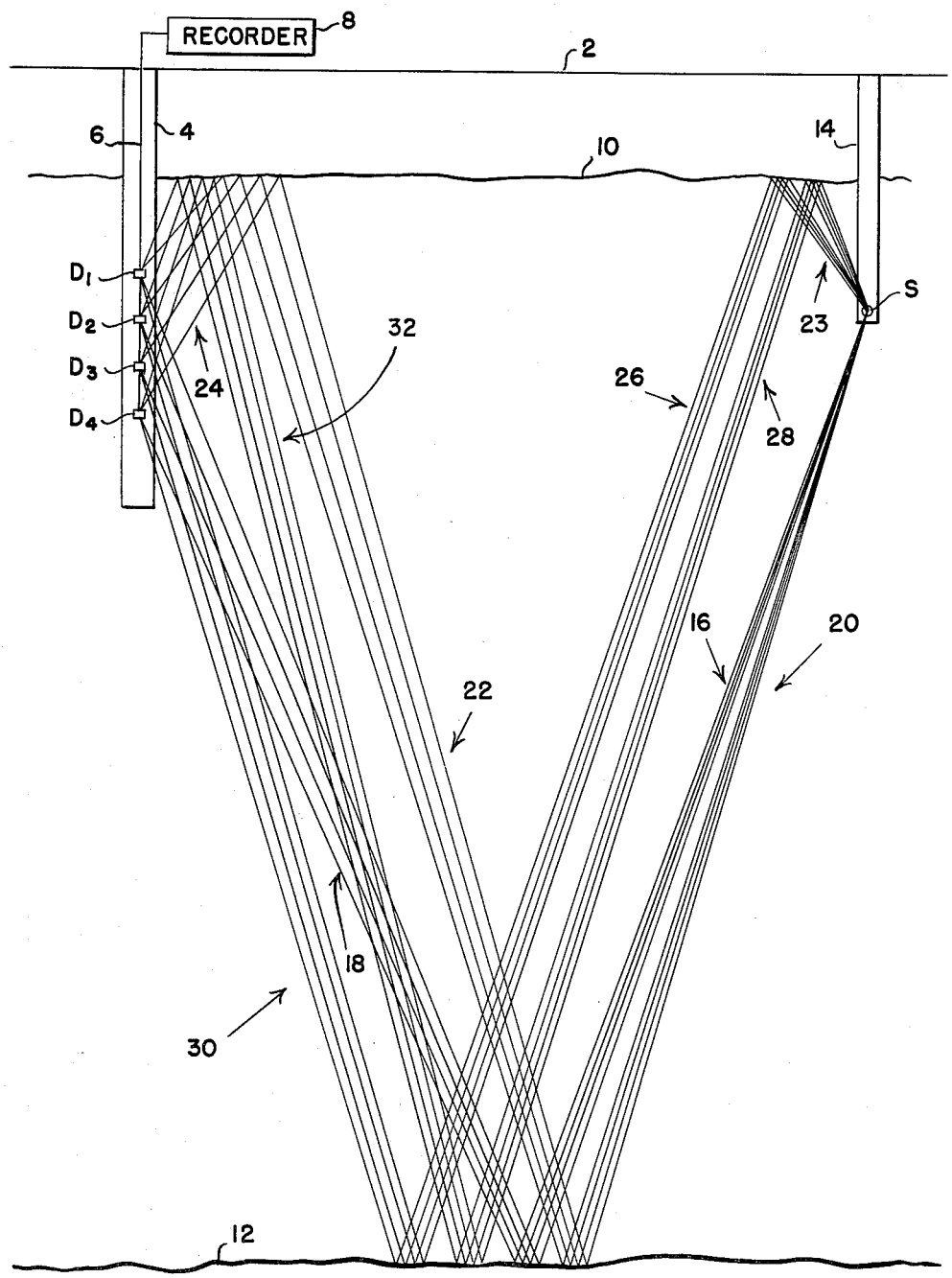
FIGURE 1 is a schematic representation of a section through the earth showing an arrangement of geophones receiving energy waves from a shot point.

In FIGURE 1 there is shown at 2 the surface of the earth and a bore hole 4 extending downwardly therefrom into the earth. Four detectors $D_1$, $D_2$, $D_3$ and $D_4$ are suspended in a vertical array within the bore hole 4 by means of a cable 6 passing to the surface of the earth and connecting each of the detectors to a recorder 8. As will become evident hereinafter, while four detectors are shown, any number of detectors may be employed and the recorder may include the conventional apparatus for modulating a carrier by the signals received from each of the detectors and then recording magnetically or otherwise each of the modulated carriers individually on a multichannel record member. This apparatus is entirely conventional and need not be described in detail herein.

The horizontal line 10 below the surface of the earth indicates an interface overlying the array of detectors $D_1$–$D_4$. The horizontal line 12 indicates an underlying interface below the array of detectors $D_1$–$D_4$. At a position remote from the bore hole 4 there is shown a second bore hole 14 within which is positioned a shot charge S which may be detonated in any conventional manner to provide a source of seismic disturbance. Waves emanating from the source of seismic disturbance will pass downwardly into the earth, as indicated in the conventional manner by the lines 16, and be reflected from the underlying interface 12 passing upwardly, as indicated by the lines 18, to the detectors $D_1$–$D_4$. The seismic waves emanating from the shot point S will also pass downwardly along the path indicated by the lines 20 and be reflected upwardly from the interface 12 along the path indicated by the lines 22 and then be reflected downwardly from the overlying interface 10 to the detectors $D_1$–$D_4$.

Waves emanating from the source of seismic disturbance will also pass upwardly, as indicated generally at 23 in FIGURE 1, and be reflected downwardly from the overlying interface 10 as indicated by the lines 26 and 28. These energy waves will be reflected from the underlying interface 12 and pass upwardly as indicated generally at 30 and 32. The waves 30 will pass directly to the detectors $D_1$–$D_4$ and the waves 32 will be reflected from the upper interface 10 downwardly to the detectors $D_1$–$D_4$, as indicated generally at 24.

The energy waves received from above the detectors will be only slightly displaced in terms of time at the detectors from the energy waves received from below the detectors. It will be evident that the energy waves received from above the detectors will tend to obscure the desired information which would normally be obtainable from the records of the waves received by the detectors directly from the underlying interface. It should also be noted that while in the figure there is shown only one overlying interface 10 and one underlying interface 12 in actual practice there may be a multiplicity of reflecting interfaces. The displacement of the record of an interfering reflection from the record of a desired reflection from the same reflecting horizon is a function of depth of the hydrophones and the interfering or "ghost" records can be completely separated from the desired records by simply increasing the depth of the hydrophone line. In this case, however, the interfering signal from one reflection could possibly interfere with a subsequent desired reflected event on the record and, therefore, its removal is still desirable.

Figure 2:
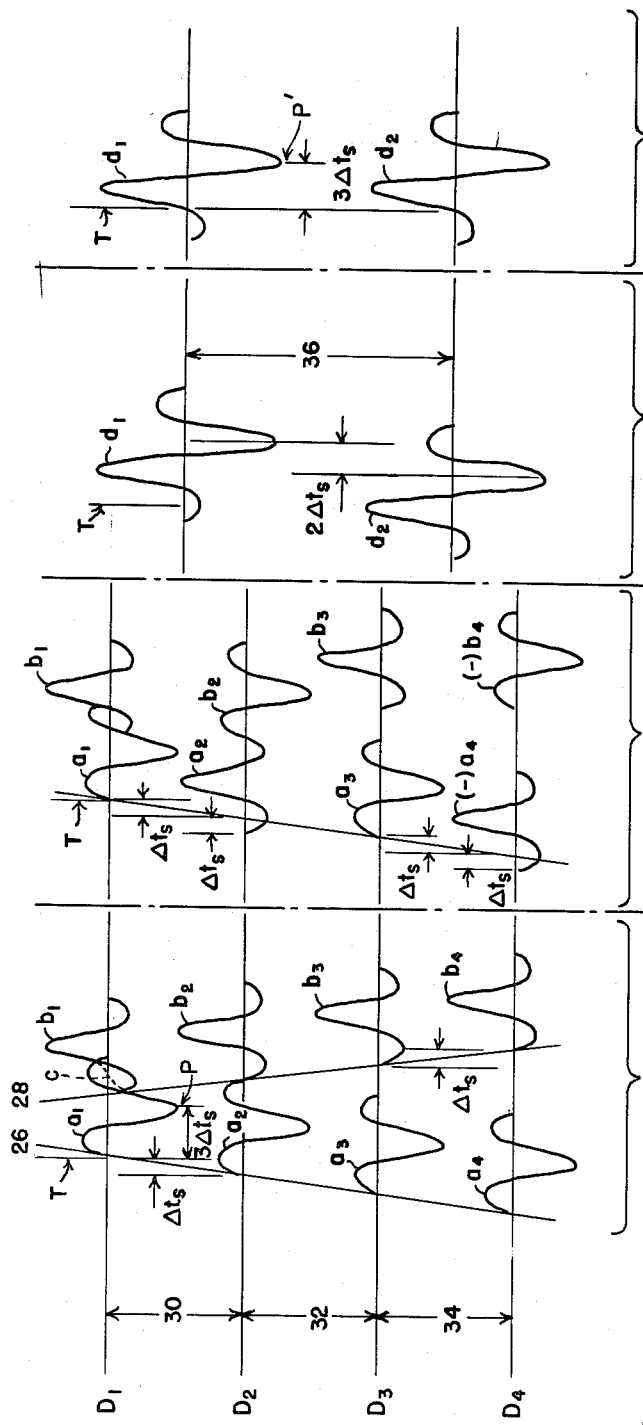
FIGURE 2A is a graphical showing of wave forms such as may appear at each of the detectors shown in Figure 1 and indicates the normal displacements between the up-traveling and down-traveling waves occurring at the various detectors.
FIGURE 2B is a graphical representation of the manipulation of the waves in accordance with the invention.
FIGURES 2C and 2D are graphical representations of further manipulations of the waves in accordance with the invention.

In FIGURE 2A there are shown four horizontal axes $D_1$, $D_2$, $D_3$ and $D_4$ about which are drawn fragmentary waves indicative of waves occurring at each of the bore holes detectors $D_1$, $D_2$, $D_3$ and $D_4$ as shown in FIGURE 1. The waves $a_1$, $a_2$, $a_3$ and $a_4$ represent signals coming to the detectors from the underlying strata 12 along the paths indicated at 18 in FIGURE 1. The displacement of these four waves, as is indicated by the line 26, results from the displacement or step-out between the detectors $D_1$, $D_2$, $D_3$ and $D_4$. Similarly, the waves $b_1$, $b_2$, $b_3$ and $b_4$ represent signals arriving at the detectors from ray paths 22 reflected from the overlying strata 10 as shown in FIGURE 1. The line 28 indicates the step-out between these waves.

For clarity, the waves shown in FIGURE 2A are drawn as fragmentary signals having their inception at the step-out lines. Actually, however, the waves will extend to the left and to the right of the step-out lines for extended distances and it is not intended that the drawings show the onset or termination of the various waves.

It may be noted that the magnitudes of the two step-outs indicated by the lines 26 and 28 are slightly dissimilar due to the difference between the angle of approach to the array of detectors of the waves indicated by lines 18 and the angle of approach of the waves by the lines 24. Thus the line 26 will not be at exactly the same angle from the vertical as is the line 28. However, the difference between the "step-outs" of these two lines will generally be within the limits of accuracy involved in selecting a reflection picking point and correction time on the record. Thus, generally this step-out difference will be negligible.

The sum of the signals $a$ and $b$ received by each of the detectors will, of course, be the output signal produced by the detector. A fragmentary portion of one of these summation signals is indicated at $c$ along the detector axis $D_1$ where the waves $a_1$ and $b_1$ are drawn as overlapping in time.

In FIGURE 2A the dimension lines 30, 32, and 34 indicate the displacement between the detectors $D_1$ and $D_2$, $D_2$ and $D_3$, and $D_3$ and $D_4$, respectively. It will be evident that the step-out between the signals at these four detectors results from and will be in proportion to the degree of displacement between these detectors. Thus, for example, if a delay equal to the step-out time between detectors $D_1$ and $D_2$ for the down-coming signals is added to the output signal of the detector $D_1$, the delay will displace the up-coming signals further out of phase than shown in FIGURE 2A but will displace the down-coming signals to a position exactly in phase with those signals received by the detector $D_2$. It will be evident that with this arrangement, if the output signals of the detectors $D_1$ and $D_2$ are subtracted, those signals arriving at the pair of detectors which are unwanted because of the direction of their origin or their step-out relation to a desired signal can be cancelled out.

It will be noted that the unwanted signals have very nearly the same apparent frequency as the wanted signals and the cancellation of unwanted signals is effective because of the inphase subtraction of the unwanted down-traveling signal which occurs independently of frequency. The effectiveness of the subtraction in cancelling the unwanted interference depends on the accuracy of the correction time and similarity of the interference signals arriving at each detector of a pair of detectors. Furthermore, there is negligible attenuation of the waves due to travel between the detectors of a pair when the detectors are all below the weathered layer and the wave shape and relative amplitude of different wave frequencies are not substantially altered during the period of wave travel between the detectors of a pair of detectors.

Since the reflection signal either up-traveling or down-traveling is similar in shape and amplitude at both detectors of a pair and since it is not necessary that this relation hold between up-traveling and down-traveling signals, the waves appearing at the detectors may be written as follows:

Let $\Delta t_s$ = the time interval for the step-out distance between a pair of detectors, assumed approximately the same for up- and down-traveling waves.

$\Delta t_t$ = time displacement between up-traveling and down-traveling signals at the top detector of the pair.

$\Delta t_b$ = time displacement between up-traveling and down-traveling signals at the bottom detector of a pair and = $\Delta t_t + 2\Delta t_s$.

$A_u$ = amplitude coefficient of the up-traveling wave.

$A_d$ = amplitude coefficient of the down-traveling wave.

Assuming sinusoidal reflection signal components;

$$A_u \sin \omega t + A_d \sin \omega(t+\Delta t_t)$$

describes the resultant wave at the top detector of each pair and $$A_u \sin \omega(t-\Delta t_s) + A_d \sin \omega(t-\Delta t_s+\Delta t_b)$$

describes the resultant wave at the bottom detector of each pair, and can be written:

$$(A_u \sin \omega(t-\Delta t_s) + A_d \sin \omega(t+\Delta t_t+\Delta t_s)$$

Delaying the top detector signal by $\Delta t_s$ and subtracting the bottom signal from the top signal:

$$A_u \sin \omega(t+\Delta t_s) + A_d \sin \omega(t+\Delta t_t+\Delta t_s)$$
$$-[A_u \sin \omega(t-\Delta t_s) + A_d \sin \omega(t+\Delta t_t+\Delta t_s)]$$

the result is:

$$A_u \sin \omega(t+\Delta t_s) - A_u \sin \omega(t-\Delta t_s)$$
$$= 2A_u \sin \omega\Delta t_s \cdot \cos \omega t$$

The wave forms shown in FIGURE 2B are the same as those shown in FIGURE 2A with the exception of the fact that the $D_2$ and $D_4$ waves have been inverted from the position shown in FIGURE 2A and the $D_1$ and $D_3$ waves have been advanced by a time interval $\Delta t_s$. Thus the down-traveling signals arriving at the detectors of each pair are aligned in time but of opposite sign.

In FIGURE 2C there is shown two waves $d_1$ and $d_2$, $d_1$ representing the summation of the $D_1$ and $D_2$ waves shown in FIGURE 2B, and $d_2$ representing the summation of $D_3$—$D_4$ waves shown in FIGURE 2B. In these summation waves, the down-traveling waves do not appear by reason of their cancellation and the up-traveling waves are reinforced. This reinforcement is provided at the same time as cancellation is accomplished as the result of the use of a detector separation providing a delay $\Delta t_s$ which is very nearly equal to one-quarter of the apparent period of the signal, i.e., by detector spacing very nearly equal to one-quarter of the apparent wave length of the signal. The degree of reinforcement of a desired signal is, therefore, a function of apparent signal frequency for a given detector spacing and correction delay.

The summation of wave $a_1$ and $b_1$ of FIGURE 2B may be considered as representing the component $$A_u \sin \omega (t+\Delta t_s) + A_d \sin \omega (t+\Delta t_t+\Delta t_s)$$

and the summation of waves $a_2$ and $b_2$ may be considered as representing the component $$-[A_u \sin \omega (t-\Delta t_s) + A_d \sin \omega (t+\Delta t_t+\Delta t_s)]$$

The wave $d_1$ shown in FIGURE 2C may be considered as representing the resultant wave produced by the subtraction of these two mathematical expressions, i.e.

$$2A_u \sin \omega \Delta t_s \cdot \cos \omega t$$

Since the phase of the up-traveling signal is known relative to this resultant for any detector position, the resultant can be corrected to a reflection datum. By correcting all of the resultants to a common datum, they are put inphase so that conventional mixing can be applied to further enhance signal-to-noise ratio on the record.

It should be noted that the waves as shown in the drawings are not represented by these equations. The equations would be true only for sinusoids but they point out the requirement of similarity between ghost signals and the inversion for concellation. The resultant $$2A_u \sin \omega \Delta t_s \cdot \cos \omega t$$

also indicates the dependence of the desired signal amplitude on $\omega$ or, more specifically, frequency, for a given phase angle or correction time, $\Delta t_s$.

In FIGURE 2C the waves $d_1$ and $d_2$ are spaced apart as indicated at 36 by a displacement which is, in theory, twice the displacement between any of the detectors $D_1$–$D_4$ as indicated at 30, 32 and 34 and thus the time interval for the step-out distance between these two waves is $2\Delta t_s$, and if the waves are displaced relatively to each other by a time interval equal to $2\Delta t_s$ the waves can all be correlated to a single datum as indicated by the line T in the figures. It will be noted that in FIGURE 2A there is indicated a point P which is the normal reflection point and at this point is displaced by a time interval of $3\Delta t_s$ from the datum point T. The same ploint in FIGURE 2D, indicated at P', is still at a time displacement of $3\Delta t_s$ from the time reference point T.

It will be noted that the foregoing mathematical analysis assumes sinusoidal wave forms, whereas the actual wave forms are non-sinusoidal. The subtraction provided by the method will be effective for cancelling out unwanted signals regardless of whether or not the signals are sinusoidal. The addition of the wanted signals, while in some cases giving rise to wave forms of somewhat dissimilar shape from the wave forms as originally recorded, produces wave forms which contain only wanted information and which are capable of being interpreted.

Figure 3:
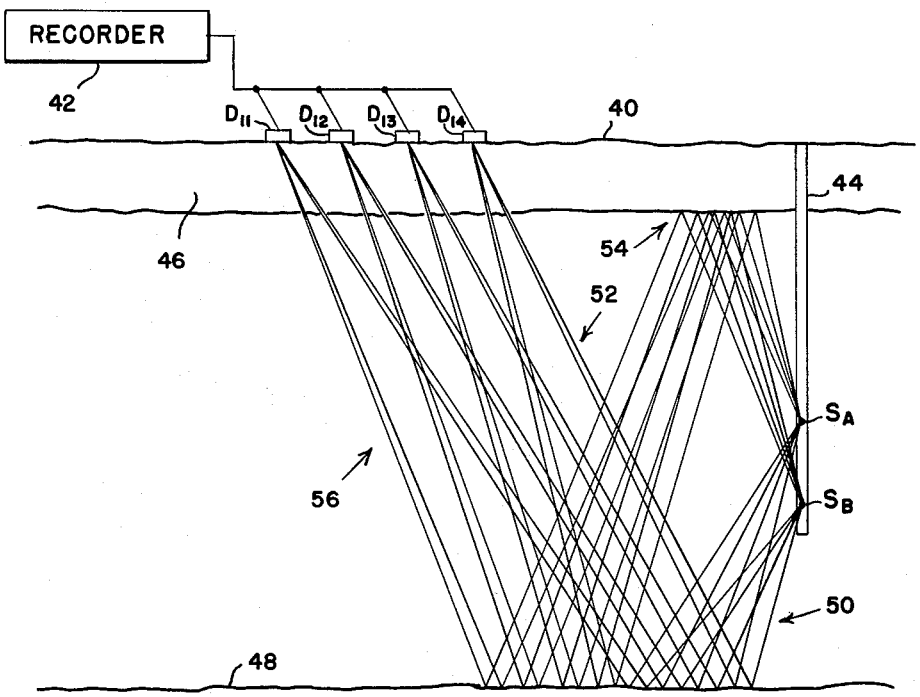
FIGURE 3 is a schematic representation of a section through the surface of the earth showing another arrangement of detectors and shot points.

In FIGURE 3 there is shown another arrangement of detectors and shot points involved in the utilization of the invention. A plurality of detectors $D_{11}$, $D_{12}$, $D_{13}$ and $D_{14}$ are deployed over the surface of the earth and have their outputs connected to a recorder 42 in conventional fashion. A bore hole 44 extends downwardly into the earth through the weathered layer 46. Positioned within the bore hole 44 below the weathered layer 46 are two charges indicated at $S_a$ and $S_b$ providing successive sources of seismic disturbances. Below the lowermost charge there is shown at 48 a subsurface reflecting interface. Energy waves emanating from each of the charges will pass downwardly into the earth as indicated at 50 and be reflected upwardly from the reflecting interface 48 as indicated at 52 to the detector $D_{11}$. Similarly, seismic waves from the charges will pass upwardly through the earth and be reflected downwardly from the lower surface of the weathered layer 46, as indicated at 54, and then be reflected upwardly from the reflecting interface 48 as indicated at 56 to the detector $D_{11}$. It will be evident that similar waves emanating from each of the shot points will be received by each of the detectors $D_{11}$–$D_{14}$. It will also be evident that while four detectors and two shot points are shown in FIGURE 3 additional detectors and/or shot points may be employed if desired. Furthermore, it will be evident that there may be involved a plurality of interfaces either above or below the array of shot points. In any event, the shots are fired separately to produce two separate records at each of the detectors. The records are thereafter reproduced and manipulated in a laboratory.

Figure 4:
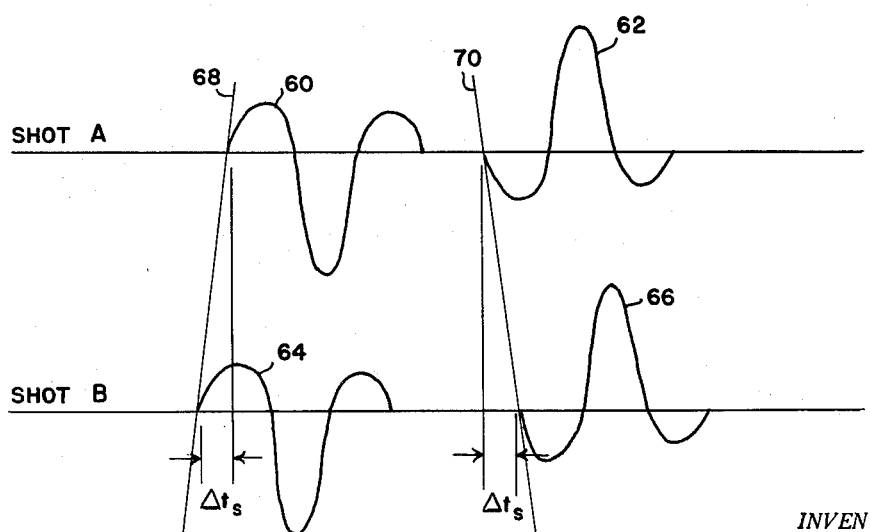
FIGURE 4 is a graphical showing of fragmentary portions of wave forms such as may appear at any one of the detectors shown in FIGURE 3 from each of the two shots down in FIGURE 3.

In FIGURE 4 there is shown a horizontal axis indicated as shot A and a second horizontal axis indicated as shot B. The wave 60 drawn on the axis shot A is the recorded wave resulting from energy passing downwardly from shot $S_a$ to the reflecting horizon 48 and then passing directly upwardly to the detector $D_{11}$. The wave 62 is the recorded unwanted energy wave reflected downwardly from the interface 46 and received at the detector $D_{11}$. Similarly, the waves 64 and 66 indicate the desired and undesired information, respectively, received by the detector $D_{11}$ from shot $S_b$. The step-out time between the waves 60 and 64 is $\Delta t_s$. This step-out time is equal to the difference in up-hole times for the two shots $S_a$ and $S_b$ shown in FIGURE 3, and should be selected, for optimum results, to be approximately one-quarter of the apparent period of the desired reflection wave. This time is controllable by the selection of shot spacing and knowledge of earth velocity. The magnitude step-out between the waves 62 and 66 is substantially the same as the step-out between the waves 60 and 64. Again it should be noted that the waves shown on the axes marked shot A and shot B are merely fragmentary portions of the total record received and are not intended as indicating either the onset or the termination of these waves. Furthermore, the actual wave recorded will, of course, be the resultant of these two waves.

Figure 5:
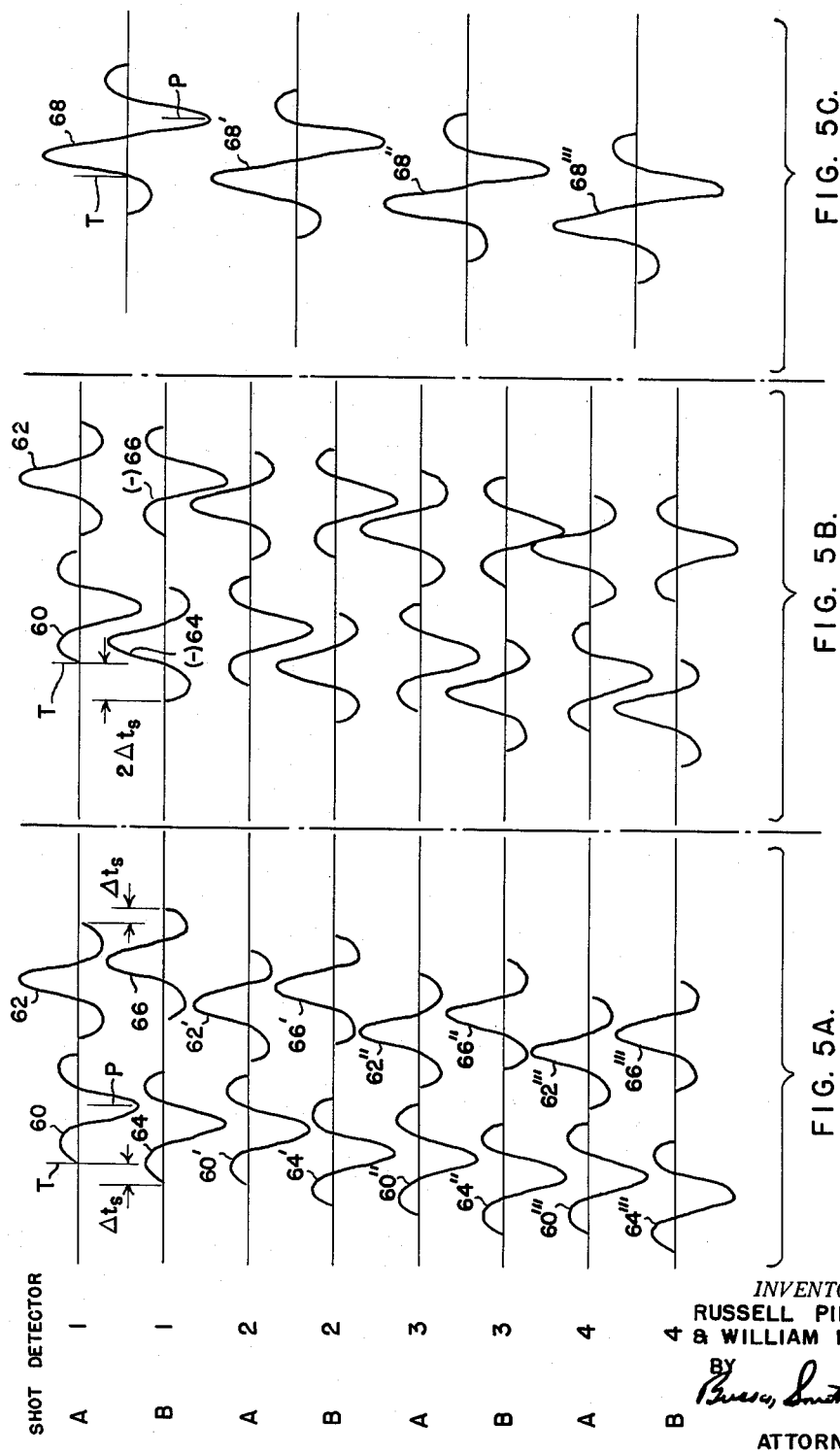
FIGURE 5A is a graphical representation showing fragmentary portions of the waves received at each of the detectors from the shots shown in FIGURE 3.
FIGURE 5B is a graphical representation showing fragmentary portions of the recorded waves shown in FIGURE 5A manipulated in accordance with the invention.
FIGURE 5C is a graphical representation showing corrected summation records made from the recordings of each of the four detectors shown in FIGURE 3.

In FIGURE 5A there is shown a composite record of the signals received at each of the four detectors shown in FIGURE 3 from the shot points A and B. For each detector these waves indicate desired and undesired information. In FIGURE 5A the waves 60, 62, 64 and 66 are identical to those shown in FIGURE 4. The waves 60', 62', 64' and 66' are the waves received at detector 2 from the shots A and B as indicated. Similarly, the figure shows the waves received at the detectors 3 and 4 from shots A and B.

FIGURE 5B shows the same waves as are shown in FIGURE 5A except that correction delays have been added to the waves 60 and 62 resulting from shot A and the waves 64 and 66 resulting from shot B have been inverted. This is the same general type of correction as has been discussed above in connection with FIGURE 2B.

FIGURE 5C shows the resulting waves attained by the addition of the waves received at each of the detectors from shots A and B. These waves are similar to those described in connection with FIGURE 2C. The interfering or unwanted signals have been removed from these waves and only the desired information has been retained. Conventional weathering and step-out corrections can now be applied to these resultants to allow for further mixing in the conventional fashion. It will be noted that a time reference point T is maintained during manipulation of the waves and a normal reflection detecting point P is also retained.

The application of the invention in the arrangement shown in FIGURE 3 may be applied to normal shooting processes with the addition of one extra shot at a specific distance from the shot normally required. The proper shot spacing can be determined from seismic information normally obtained for any area.

It should also be noted that the process may be applied in a reverse sense in order that desired information can be eliminated from the record and only the interference signals retained for information and study if desired. By use of conventional apparatus the various recordings may be made in the field and then the recorded records reproduced in a laboratory where manipulation may be accomplished under laboratory conditions. Under these conditions, unwanted signals from various interfaces can be cancelled out and unwanted signals such as those traversing the course indicated at 26 and 30 in the arrangement shown in FIGURE 1 can be cancelled by further application of the method described herein.

Figure 6:
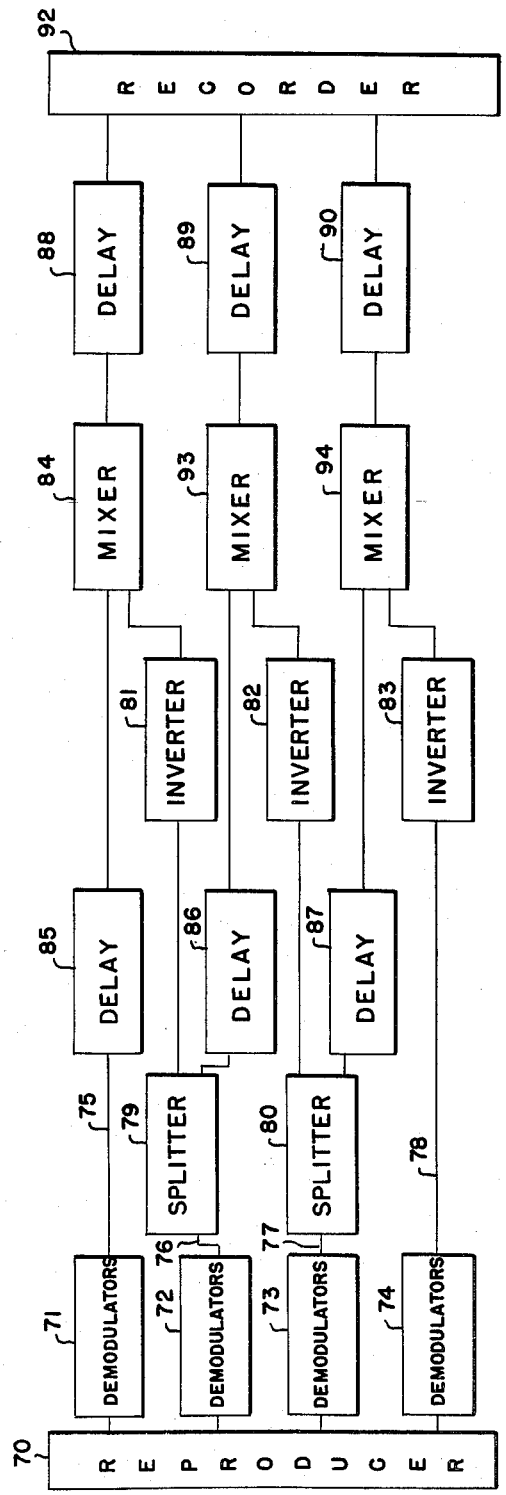
FIGURE 6 is a diagram showing the electrical apparatus involved in reproducing the records made from the various detectors in accordance with the invention.

In FIGURE 6 there is shown diagrammatically electrical apparatus involved in reproducing the records made from the various detectors shown in FIGURE 1. The multichannel record produced in the field is played back through a conventional reproducer 70. The output of the reproducer 70 comprises the four modulated carrier signals recorded by the recorder 8 shown in FIGURE 1 which are passed through demodulators 71, 72, 73 and 74, respectively, from which the individual signals, representing the outputs from detectors $D_1$, $D_2$, $D_3$ and $D_4$ are passed through conductors 75, 76, 77 and 78, respectively. The signals in lines 76 and 77 are each passed through a signal splitter 79 and 80, respectively, serving to split each of the two signals providing two outputs from each. One output from the splitter 79 is passed to an inverter 81 from which the inverted signal is delivered to a mixer 84. The signal passing through the line 75 is delivered to a delay network 85 which serves to delay the signal for a time interval equal to the step-out displacement for down-coming waves between the detectors $D_1$ and $D_2$. The delayed signal is then delivered to the mixer 84 in which it is added to the inverted signal from the detector $D_2$ and the combined output signal from the mixer is delivered through a delay network 88 to one channel of the multichannel recorder 92.

From the foregoing, it will be evident that this signal delivered to the recorder will represent the energy received from up-coming signals and will not have the record obscured by recording of energy arriving at the detector from down-coming signals.

Similarly, the other signal output from the splitter 79 is fed through a delay network 86 to a mixer 93, and the output from the demodulator 73 is delivered through a splitter 80, one channel of which is passed through an inverter 82, the output from which is also delivered to the mixer 93. The output of the mixer 93 is passed through a delay network 89, output from which is delivered to a second channel of the recorder 92.

The other output from the splitter 80 is passed through a delay network 87 to a mixer 94. The output from the demodulator 74 passing through line 78 is passed through an inverter 83 and to the mixer 94. The output of the mixer 94 passes through a delay network 90 to a third channel of the recorder 92.

From the foregoing, it will be evident that the records received from the four detectors $D_1$, $D_2$, $D_3$ and $D_4$ reproduced into conductors 75, 76, 77 and 78 are manipulated in accordance with the technique described above so as to produce at the recorder 92 three records one of which is a combination of the signals received from detectors $D_1$ and $D_2$ but including only those signals received from up-coming energy waves. The second record at the recorder 92 is a combination of the recordings from detectors $D_2$ and $D_3$ but includes only signals received from up-coming energy waves. The third record at the recorder 92 is a combination of the records received from detectors $D_3$ and $D_4$ but also includes signals received from up-coming energy waves. Thus the arrangement shown provides for the production of three corrected records from four uncorrected records. While the arrangement described in connection with FIGURES 1 and 2 refers to the use of only four detectors, it will be noted that any number of detectors and recorder channels may be employed.

The same general apparatus shown in FIGURE 6 may be employed for manipulating the records obtained by the arrangement shown in FIGURE 3. It will be evident, however, upon viewing FIGURES 5A and 5B that for four detectors and two shots, a total of eight recorder channels are involved, and the splitters shown in FIGURE 6 are not employed. In connection with the manipulatation of the signals shown in FIGURES 5A, 5B and 5C there would be employed eight demodulators, four delays, four inverters, four mixers, four delay networks and a four-channel recorder. Again it will be evident that this arrangement may be expanded to accommodate any desired number of channels within practical limits well known in the art.

The various electrical components employed in the arrangement described in connection with FIGURE 6 and the modification thereof referred to in connection with FIGURES 3 and 5A are all entirely conventional and well known and, therefore, need not be described in detail herein.

From the foregoing, it will be evident that the invention provides for the removal of a particular type of seismic noise which is non-random and which can be eliminated because of the fact that the step-out of the interfering noise, its relation to a desired signal and the similarity of the unwanted noise appearing in a plurality of records, is sufficient to provide for its cancellation.

What is claimed is:

1. The method of seismic surveying comprising positioning a pair of detectors in spaced vertical array in the earth, creating a seismic disturbance in the earth, recording the outputs of the two detectors each of which includes a component produced by seismic waves reflected only from a single stratum and representing desired information and a component produced by seismic waves reflected from a plurality of strata and representing undesired information, the spacing between detectors being predetermined to provide step-out between one pair of corresponding components in the two recordings of approximately one-quarter the apparent wave length of the other component, displacing with respect to each other the output signals from the detectors resulting from the seismic disturbance by a time interval equal to the step-out time for the spacing between the detectors and subtracting the relatively displaced output signals to cancel out the inphase components thereof.

2. The method of seismic surveying comprising positioning a pair of detectors in spaced vertical array in the earth, creating a seismic disturbance in the earth, recording the outputs of the two detectors each of which includes a component produced by seismic waves reflected only from a single stratum and representing desired information and a component produced by seismic waves reflected from a plurality of strata and representing undesired information, the spacing between detectors being predetermined to provide step-out between the corresponding undesired components respectively in the two recordings of approximately one-quarter the apparent wave length of the corresponding desired components respectively in the two recordings, reproducing the output signals from the detectors resulting from the seismic disturbance displacing said reproduced signals with respect to each other along a time scale by a time interval equal to the step-out time for the spacing between the detectors, and subtracting the relatively displaced reproduced signals to cancel out the inphase components thereof.

(References on following page)

References Cited in the file of this patent

UNITED STATES PATENTS

| | | |
|---|---|---|
| 1,676,619 | McCollum | July 10, 1928 |
| 2,018,737 | Owen | Oct. 29, 1935 |
| 2,087,702 | Peters | July 20, 1937 |
| 2,243,730 | Ellis | May 27, 1941 |
| 2,578,133 | Hawkins | Dec. 11, 1951 |
| 2,634,398 | Piety | Apr. 7, 1953 |
| 2,732,906 | Mayne | Jan. 31, 1956 |
| 2,740,945 | Howes | Apr. 3, 1956 |
| 2,767,389 | McCollum | Oct. 16, 1956 |
| 2,795,287 | Sharpe | June 11, 1957 |
| 2,882,988 | Dobrin | Apr. 21, 1959 |

OTHER REFERENCES

Handley: "How Magnetic Recording Aids Seismic Operations," Oil and Gas Journal, Jan. 11, 1954, pages 158 and 159.